United States Patent [19]
Espenlaub et al.

[11] 3,843,926
[45] Oct. 22, 1974

[54] ELECTRONIC SAMPLING SYSTEM

[75] Inventors: Walter C. Espenlaub, Syosset; Anthony D. Leotta, Holbrook, both of N.Y.

[73] Assignee: The United States of America as represented by the Secretary of the Air Force, Washington, D.C.

[22] Filed: Feb. 2, 1972

[21] Appl. No.: 223,035

[52] U.S. Cl................. 324/102, 324/77 A, 328/151
[51] Int. Cl............................................. G01r 27/28
[58] Field of Search.................. 324/102, 77 A, 121; 328/151

[56] References Cited
UNITED STATES PATENTS

| | | | |
|---|---|---|---|
| 3,278,846 | 10/1966 | Patten et al. | 324/77 A |
| 3,484,689 | 12/1969 | Kerns | 324/102 |
| 3,633,101 | 1/1972 | Johnson et al. | 324/102 |

*Primary Examiner*—Maynard R. Wilbur
*Assistant Examiner*—G. E. Montone
*Attorney, Agent, or Firm*—Harry A. Herbert, Jr.; George Fine

[57] ABSTRACT

An electronic sampling system is provided. A signal and a trigger are passed in opposite directions along a parallel bank of samplers which are spaced at predetermined intervals along coaxial lines thus resulting in time isolation.

2 Claims, 1 Drawing Figure

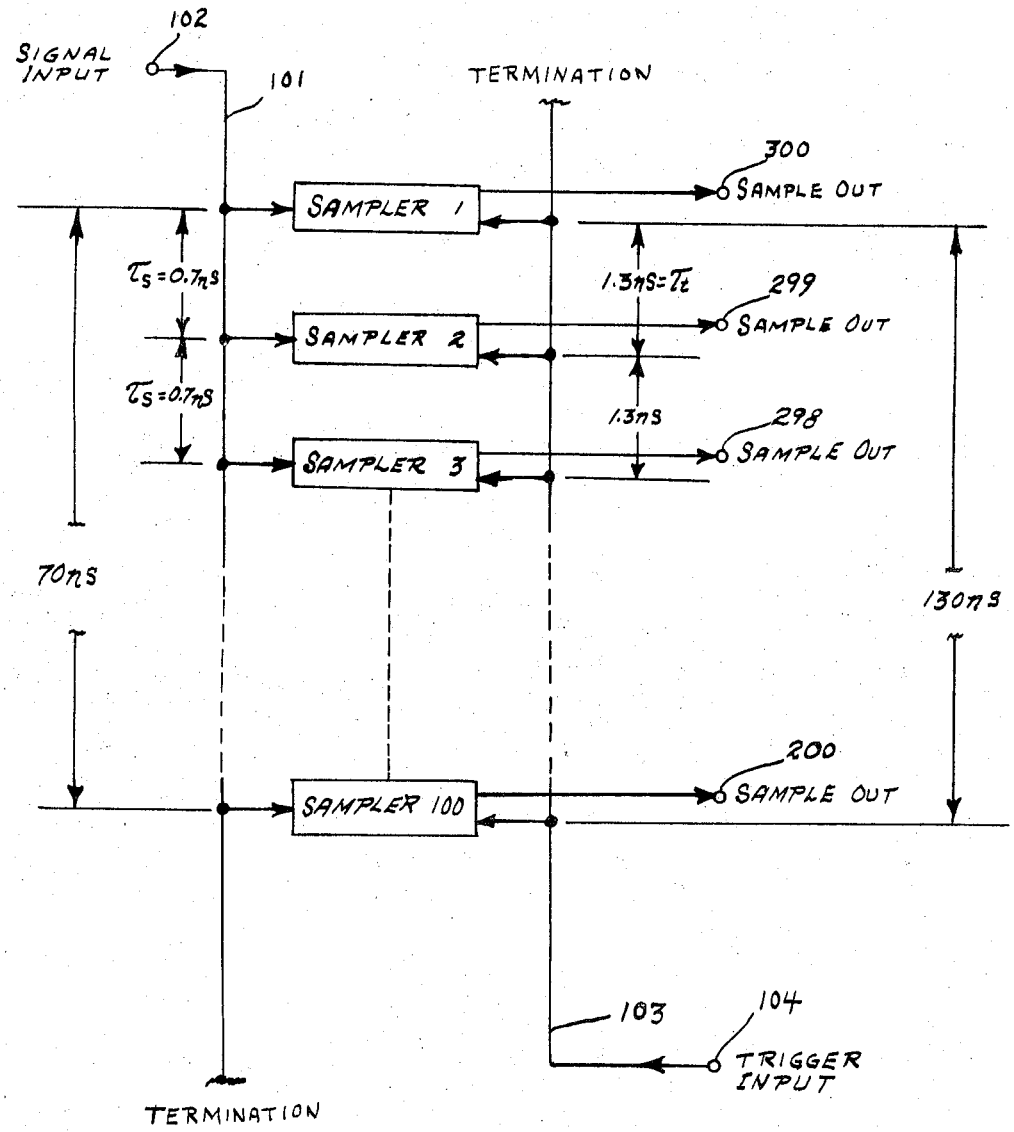

ELECTRONIC SAMPLING SYSTEM

BACKGROUND OF THE INVENTION

To observe wideband signals on an oscilloscope a sampler followed by a modest bandwidth oscilloscope has been used for years. In this conventional sampling system the signal to be observed repeats at a pulse repetition frequency $f_{PRF}$, while the sampler samples it at a slightly lower frequency $f_s = (1)/1/f_{PRF} + \Delta = (1)/T_p + \Delta = (1)/T_s$.

The latter portion of this expression illustrates that the sampling period ($T_s$) is greater than the pulse repetition period ($T_p$) by a small amount $\Delta$ related to the resolution of the sampler or the bandwidth of the signal being sampled. This technique is economical and efficient if the signal is repetitive. For transient signals or for economical use of radar signal returns the signal to be sampled is available only a single time. To obtain the many ($N$) samples (separated by $\Delta$) required for the oscilloscope either the signal must be delayed (by $T_p$) in a recirculating loop for the repeated application to a sampler or a bank of parallel samplers can be used. The technique of the present invention is to apply the signal to all samplers in parallel and apply the triggers to the $N$ samplers time separated by $\Delta$. Problems arise due to loading of the signal line, sample pulse feed through onto the signal line and the physical problems of electrically paralleling $N$ sampler inputs wihout the losses of corporate feed. The present invention provides a unique and efficient arrangement for paralleling samplers.

SUMMARY OF THE INVENTION

An electronic sampling system is provided having parallel samplers. The samplers are spaced along the signal line at 0.7 ns intervals. A single sampler does not upset the coax line VSWR and trigger timing is such that the sample feed through has passed beyond the next sampler before the sample pulse begins. Triggers are fed to the samplers at 1.3 ns intervals, thus a 0.6 ns sample period can be tolerated without a subsequent sampler having interference with feed through from an adjacent sampler. Efficient use is also made of the pair of coaxial lines since the effective spacing between signal samples is 2 ns, the sum of the signal and trigger coax delays. Further economies can be achieved when the trigger bandwidth is less than the signal bandwidth, or if (as is expected) more distortion can be tolerated in the trigger path; the trigger coax can be smaller in diameter (less critical and more distortion) than the signal coax.

One unique and novel feature of the parallel samplers is that there is no need for a repetitive signal and hence more efficient use of a transient signal.

Another is that there is no requirement for storage and recirculation of wideband signals.

Still another is an efficient parallel feed of signal and trigger without loss.

Yet another is the use of delay/space for isolation of sampler from trigger feed through an adjacent sampler.

Yet still another is the minimum low distortion coax used for given total sampled interval:

$= (N-1)(T_s + T_t) = (100 - 1)(0.7 + 1.3) = 198$ ns.

DESCRIPTION OF THE DRAWINGS

The single FIGURE shows in block diagram form the electronic sampling system of the present invention including parallel samplers.

DETAILED DESCRIPTION OF THE PREFERRED EMBODIMENT

Now referring in detail to the single FIGURE, parallel samplers 1–100 are spaced along signal coax line 101 at 0.7 ns intervals for a total of 70 ns. The samplers are conventional and may be of the sample and hold type. The signal to be sampled is received at input terminal 102 and applied to samplers 1 through 100 in that order. A trigger signal is received at input terminal 104 and applied by way of coax trigger line 103 to sampler 100 down to 1 also in that order. The triggers are fed to the samplers at 1.3 ns intervals for a total of 130 ns. Thus a 0.6 ns sample period can be tolerated without subsequent sampler having interference with feed through from an adjacent sampler. Efficient use is made of the pair of coaxes since the effective spacing between signal samples is 2 ns, the sum of the signal and trigger coax delays. Sample outputs are provided by way of terminals 200 through 300.

The system of the FIGURE is an illustration of time isolation where isolation for up to 600-ps samples is provided A 400-ps pulse introduced in signal 101 by sampler N has passed by the input of sampler (N-1) by the time the trigger reaches (N-1) sampler. This technique results in negligible signal loss and by using Foamflex signal coaxial cable of ½ inch diameter or larger the rise time degradation is a negligible 20 ps or less. Foamflex is a trade name of semirigid foam-filled cable manufactured by Phelps-Dodge Corporation.

What is claimed is:

1. An electronic sampling system comprising a multiplicity of samplers in parallel arrangement, each of said samplers having a signal input, a trigger input, and providing a sample output signal in response to a trigger input signal, a coaxial signal line, an input terminal for said coaxial signal line receiving a transient signal available once for sampling, each of said signal inputs being spaced along said coaxial signal line at a first predetermined time interval beginning with the first sampler connected to the signal input terminal and ending at the last sampler, a coaxial trigger line, an input terminal for said coaxial trigger line receiving a trigger signal, each of said trigger inputs being spaced along said coaxial trigger line at a second predetermined time interval beginning with said last sampler connected adjacent to the trigger input terminal and ending with said first sampler, with the trigger timing being such that the sample feed through has passed beyond the next sampler before the sample pulse begins and including means to pass said signal and trigger signals in opposite directions along said multiplicity of samplers resulting in a total sampled interval that is the sum of the electrical length of the signal and trigger lines.

2. An electronic sampling system as defined in claim 1 wherein each of said samplers is comprised of a sample and hold circuit.

* * * * *